United States Patent [19]
Allen

[11] Patent Number: 5,988,563
[45] Date of Patent: Nov. 23, 1999

[54] ARTICULATING WINGLETS

[75] Inventor: John B. Allen, Long Beach, Calif.

[73] Assignee: McDonnell Douglas Corporation, St. Louis, Mo.

[21] Appl. No.: 09/001,147

[22] Filed: Dec. 30, 1997

[51] Int. Cl.$^6$ ............... B64C 3/56; B64C 3/38; B64C 5/10; B64C 5/06
[52] U.S. Cl. ............ 244/49; 244/45 R; 244/90 R; 244/91
[58] Field of Search ............ 244/49, 123, 124, 244/34 R, 35 R, 198, 199, 203, 218, 91, 45 R, 90 R, 76 C

[56] References Cited

U.S. PATENT DOCUMENTS

| | | | |
|---|---|---|---|
| 2,397,526 | 4/1946 | Bonbright | 244/12 |
| 2,418,301 | 4/1947 | Heal | 244/75 |
| 2,523,579 | 9/1950 | Lloyd | 244/76 C |
| 2,562,905 | 8/1951 | Gadeberg | 244/91 |
| 2,620,150 | 12/1952 | Atwood et al. | 244/76 C |
| 4,455,004 | 6/1984 | Whitaker, Sr. | 244/90 R |
| 4,722,499 | 2/1988 | Klug | 244/199 |
| 5,072,894 | 12/1991 | Cichy | 244/91 |
| 5,310,138 | 5/1994 | Fitzgibbon | 244/49 |
| 5,427,329 | 6/1995 | Renzelmann et al. | 244/49 |

*Primary Examiner*—Charles T. Jordan
*Assistant Examiner*—Theresa M. Wesson
*Attorney, Agent, or Firm*—Westerlund & Powell; Robert A. Westerlund; Raymond H.J. Powell, Jr.

[57] ABSTRACT

The present invention is directed to a unique foldable winglet assembly adaptable for use with an aircraft for maximizing the wing span of the aircraft during cruise operation while reducing wing bending moment during extreme flight maneuvers. A foldable winglet is pivotally joined to the aircraft wing and is rotatable during flight between a retracted position and a fully extended position. An actuator is mounted on the aircraft wing and attached to the foldable winglet. When the aircraft reaches cruise operation, the actuator can be manually or automatically energized to pivot the winglet from a substantially vertical, retracted position to a fully extended position wherein the winglet becomes an extension of the wing. During cruise, the wing and winglet form an enlarged wing that serves to maximize lift of the aircraft. When loads more severe than would occur at or near cruise, such as dive, are encountered, the loads overcome the action of the actuator and pivot the winglet to its initial, vertical position. This action, serves to reduce the bending moment acting on the wing as well as increase aerodynamic efficiency of the aircraft.

11 Claims, 2 Drawing Sheets

ARTICULATING WINGLETS

BACKGROUND OF THE INVENTION

The present invention relates generally to the concept of airplanes having folding winglets, and more particularly, to winglet assemblies which can be extended during cruise to increase span and automatically/passively retracted to an upright position as needed to reduce the wing bending moment and aircraft weight when subjected to large loads at conditions such as dive.

Because of the reduced size of the flight deck and reduced hangar space, it has long been known to fold the wings of fighter aircraft when stored onboard aircraft carriers. Such aircraft normally include a power driven actuator system which functions to move an outboard portion of the aircraft wing between an extended position suitable for flight and a retracted storage position. U.S. Pat. No. 5,310,138 entitled "Wing Fold Actuator System for Aircraft" issued May 1994 to Thomas F. Fitzgibbon is believed to be typical of such an aircraft. It is noted that the actuator system is provided to pivot the wing from a folded position when stored to an extended position prior to flight. The disclosure of the '138 patent is herein incorporated by reference. There is no suggestion in the '138 patent of pivoting the wing between deployed and retracted positions during operation of the aircraft.

It is known that having an aircraft's winglets extend at an angle to the remaining portion of the wing can affect the flight characteristic of the aircraft. U.S. Pat. No. 5,072,894 entitled "Apparatus and Method for Increasing the Angle of Attack Operating Range of an Aircraft" issued December 1991 to Daniel R. Cichy, the disclosure of which is herein incorporated by reference, teaches that the by employing vertically downwardly extending tip fins, it is possible to increase the angle of attack operating range of an aircraft. At high angles of attack, the tip fins extend approximately 90° to the inboard portion of the wing. There is no suggestion of raising the tip fins above the wing nor is there any suggestion of extending the tip fins during flight.

Commercial aircraft have been known to employ foldable wing tips which can be raised to reduce the landing space occupied by the aircraft. By raising the wing tips, aircraft having large wings, such as the Boeing 777, can reach current loading gates that would otherwise be unavailable. A latching mechanism for locking the wing tips in their upright position when on the ground is taught in U.S. Pat. No. 5,427,329 entitled "Locking Hydraulic Latch Pin Actuator" issued June 1995 to Michael E. Renzelmann et al, the disclosure of which is herein incorporated by reference. A hydraulic actuator is employed to move the primary lock member between locked and unlocked positions when the aircraft is on the ground. There is no suggestion in the '329 patent that the wing tips are movable when the aircraft is in flight.

None of the cited patents employs a wing including a foldable winglet that can be folded while the aircraft is in flight. As a result, none of the cited patents can take advantage of the extended winglets during cruise and folded winglets during more severe load conditions.

The present invention overcomes the size and structural weight problems associated with a large span while retaining the reduced drag benefit of a large span during cruise.

SUMMARY OF THE INVENTION

The present invention is directed to an articulating winglet which is adaptable for use on commercial aircraft. The winglet consists of a winglet attached to a wing by a conventional hinge. An actuator mounted in the wing assembly can be powered to raise or lower each winglet about its hinge. Where airport compatibility issues restrict the wing span of the aircraft, the winglets can be rotated to vertical or nearly vertical positions.

Once the aircraft has climbed to its cruise altitude, the actuators can be energized to extend the winglets. As long as the aircraft remains near cruise conditions, the winglets will remain extended, reducing the drag and thereby increasing the aerodynamic efficiency of the aircraft. In effect, the winglets allow use of greater span than do wings of conventional design. This results in aircraft with articulating winglets outperforming aircraft with standard wing configurations.

By design, the actuators are capable of holding the winglets in their extended positions only when confronting aerodynamic loads no more severe than the conditions encountered at or slightly beyond cruise condition. When the aircraft begins to perform a maneuver that would substantially increase the load condition on the wing, the aerodynamic loads will overcome the actuators and automatically return the winglets to their nearly vertical positions. This greatly reduces the structural weight penalty encountered by the winglets when extended.

The present invention increases the aerodynamic efficiency of the aircraft by extending the winglets during cruise to reduce drag. At the same time, automatic retraction of the winglets i.e., passive load alleviation, reduces the wing bending moment and aircraft weight as occurs during severe load conditions, without imposing an undue weight penalty.

BRIEF DESCRIPTION OF THE DRAWINGS

The above and other objects, features, and advantages of the present invention will become apparent from the following detailed description taken in conjunction with the accompanying drawings, in which.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
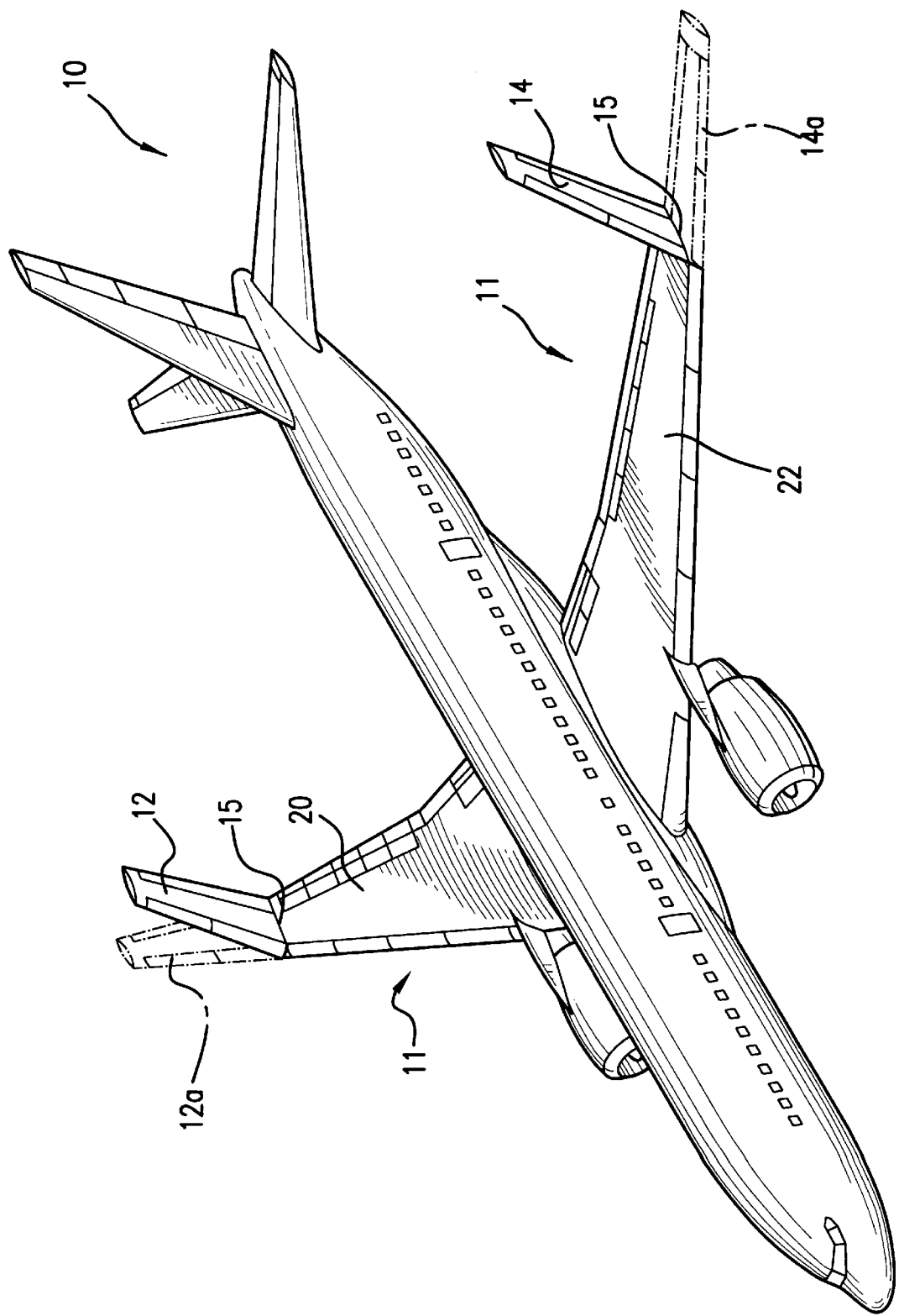
FIG. 1 is a schematic view of an aircraft having folding winglets, wherein the extended position of the winglets is shown in phantom lines.

With reference now to FIG. 1, there can be seen a schematic view of a jet aircraft having winglets constructed in accordance with the present invention. Aircraft 10 includes a pair of wings 11 having at their outboard ends a pair of foldable winglets 12 and 14. The solid lines show the winglets 12 and 14 in their upwardly-folded or retracted positions. The winglets assume this position when aircraft 10 is parked to load and offload passengers at a conventional airport. In addition, the winglets 12 and 14 will assume their retracted positions when the aircraft 10 is undergoing severe flight loads as will be explained below.

The dashed lines 12a and 14a show the same winglets fully extended and aligned with the axis of the wing inboard portions 20 and 22, respectively. As will be explained, the winglets may assume the positions shown in 12a and 14a when there is no restriction on the size of the airport requiring the winglets to be retracted. More importantly, when the aircraft reaches cruise, the winglets may be extended to the positions shown at 12a and 14a in order to maximize lift while reducing drag. Each of the winglets 12 and 14 is attached to an end of a wing 11 by means of a hinge assembly 15 positioned between a wing and winglet. Each hinge assembly 15 preferably extends substantially parallel to a longitudinal axis of aircraft 10 in order that each of the winglets 12 and 14 may be pivoted into vertical or nearly vertical positions with respect to the substantially horizontal positions of the wings 11.

Figure 2:
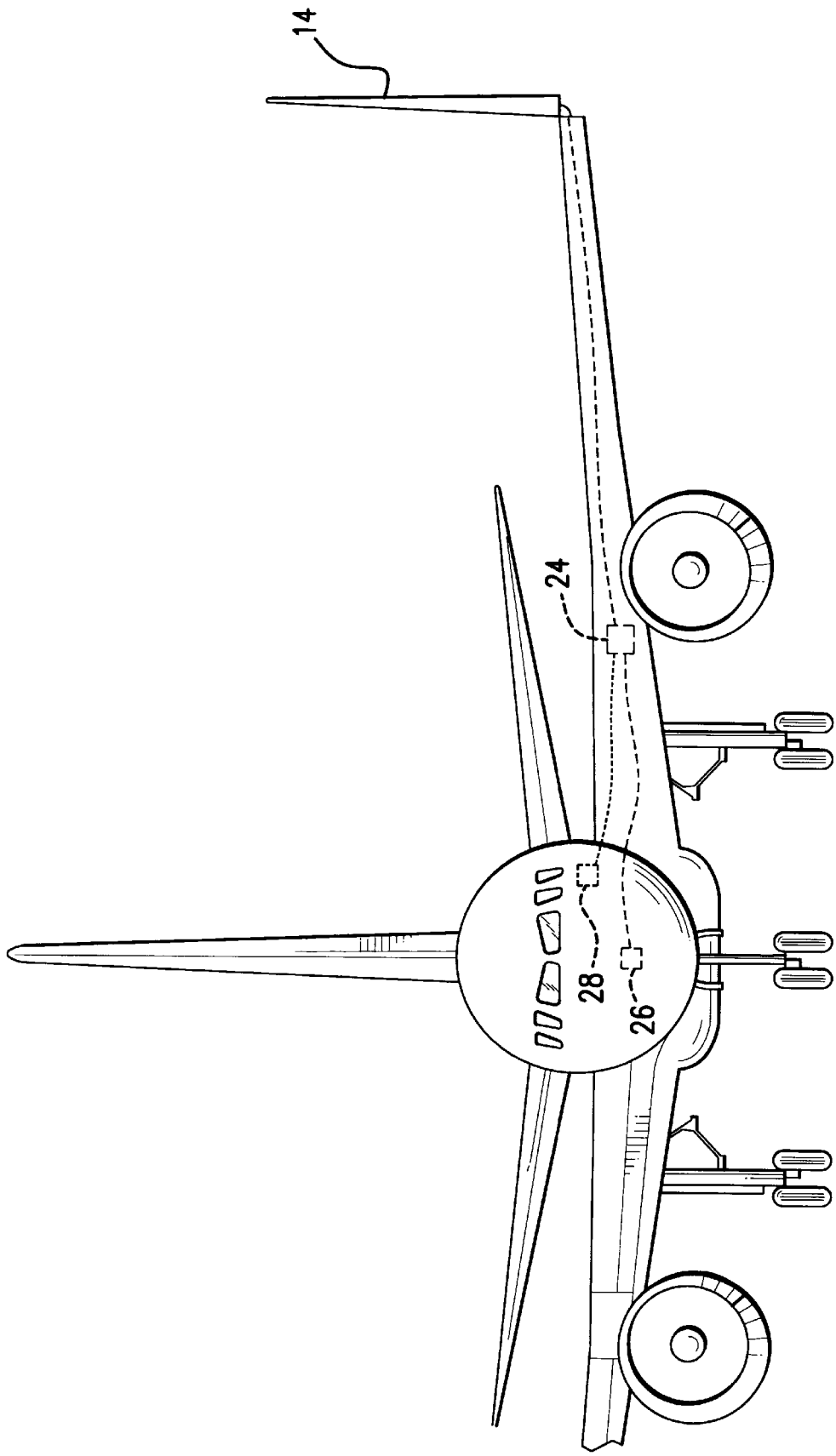
FIG. 2 is a depiction of the control circuit for repositioning the winglets shown in FIG. 1 between their retracted and extended positions.

FIG. 2 depicts a conventional mechanism for operating the winglets 12 and 14. An actuator 24 may be selectively energized to rotate the winglets between the retracted positions 12 and 14 and their extended positions 12a and 14a. Actuator 24 may comprise any well known assembly which may be mechanical, fluid, electrical or a combination thereof.

One such well known actuator adaptable for moving a portion of an aircraft wing 11 to control the outboard ailerons is manufactured by Parker Bertea, employed on the MD-11 and identified as part number P/N BRG002. In order to prevent damage to the aircraft during extreme operating conditions of the MD-11, such as may occur during dive or high speed buffeting, the outboard ailerons are designed to float trailing edge upward. This float is not commanded by any active load alleviation system. Rather, the actuators BRG002 employed to control the position of the ailerons are unable to resist the aerodynamic hinge moments acting on the ailerons that arise during dive or high speed buffeting. As a result, the moments acting on the aileron during extreme conditions overpower the torque supplied by the actuator and pivot the aileron to a predetermined upward float position in an attempt to return the aircraft to a more stable flight condition. It has been discovered that the same type of actuator employed for aileron control in the MD-11 can be utilized in a new and unique way for controlling the movement of articulating winglets attached to the aircraft wings. Regardless of the form of actuator 24, its operation in controlling the winglets is the same.

During operation, it will be assumed that aircraft 10 is on the ground and has taxied to the terminal to load passengers. Winglets 12 and 14 are in their vertical or almost vertical positions in order to minimize ground space at the terminal. Once aircraft 10 has been loaded, taken-off and climbed to near cruising altitude, actuator 24 is selectively energized to pivot the winglets from their fully retracted positions to their fully extended positions 12a and 14a. Actuator 24 may be actuated by the flight crew depressing button 26 or automatically actuated by a sensor 28 shown in phantom when it determines that the aircraft 10 is at or near cruise condition. Regardless of what energizes actuator 24, pivoting the winglets 12 and 14 to their extended positions acts to maximize the wing span of aircraft 10 while, at the same time, reducing the drag effect of the vertically extending winglets, thereby improving the aerodynamic efficiency. As aircraft 10 continues in cruise, the winglets 12 and 14 remain in their fully extended positions 12a and 14a under pressure of actuators 24.

It is important to note that winglets 12 and 14 are not locked in their extended positions but only remain extended as long as the torque supplied by actuators 24 to extend the winglets is greater than any opposing aerodynamic moment tending to rotate the winglets back to their retracted positions. Each actuator 24 is carefully calibrated to assure that it can supply adequate torque to force a winglet to remain extended when the aircraft is in cruise. However, once a maneuver begins which increases the load on the wings, the aerodynamic moment of the winglet will overcome the effect of actuators 24 and pivot the winglets from their extended positions back to their retracted positions. This passive design feature causes the winglets to automatically retract in response to extreme loads, thereby reducing the wing bending moment and aircraft weight. Because the forces acting on the wings function to rotate the winglets, the effect is that of passive load alleviation which eliminates the need to command actuators 24 to return the winglets to their retracted, nearly vertical positions.

Actuators 24 supply the torque for extending the winglets and the dynamic load conditions encountered during flight supplies the power for retracting the winglets. By calibrating the torque capability supplied by actuators 24, it is possible to dispense with a separate locking mechanism for holding the winglets in their extended positions. However, it is considered within the scope of the present invention to incorporate a removable lock which can be withdrawn when it becomes necessary to pivot the winglets between their retracted positions 12 and 14 and their extended positions 12a and 14a, respectively.

By design, the actuators 24 are capable of holding the winglets in their extended positions only for structural load conditions no more severe than encountered at or slightly beyond cruise conditions. When more severe conditions arise, the aerodynamic moments will overpower the torque supplied by actuators 24, causing the winglets to move in a steady manner towards their retracted positions. This feature of the present invention reduces the structural weight penalty otherwise resulting from extending the winglet.

In general, although a preferred embodiment of the present invention has been described in detail hereinabove, it should be clearly understood that many variations and/or modifications of the basic inventive concepts herein taught which may appear to those skilled in the pertinent art will still fall within the spirit and scope of the present invention, as defined in the appended claims.

Having thus described my invention, what I claim as new and desire to secure by Letters Patent is as follows:

1. An improved aircraft including at least one wing, comprising:

a foldable winglet located at an outboard end of each wing;

a separate hinge assembly joining each wing to a respective one of the foldable winglets, allowing the respective winglet to pivot relative to the wing between a retracted position wherein the winglet extends substantially perpendicularly to an inboard portion of the wing and a fully extended position wherein the respective winglet forms an extension of the wing;

an actuator assembly attached to each foldable winglet for rotating each winglet from its retracted position to its fully extended position when the airplane is in cruise operation; and wherein the actuator assembly is adapted to allow each foldable wing to pivot from its fully extended position to its retracted position when the aircraft encounters severe loads as may arise when the aircraft performs a dive maneuver.

2. An improved aircraft according to claim 1, wherein each separate hinge assembly extends substantially parallel to a longitudinal axis of the aircraft.

3. An improved aircraft according to claim 1, wherein the actuator assembly is manually energized to move the winglets to their fully extended positions when the aircraft is at or nearly at cruise condition.

4. An improved aircraft according to claim 1, wherein the actuator assembly is energized by a sensor adaptable for sensing when the aircraft is at or nearly at cruise flight condition.

5. An improved aircraft according to claim 1, wherein the actuator assembly comprises a separate actuator attached to a respective one of the winglets.

6. An improved aircraft according to claim 1, wherein the actuator assembly is adapted to allow each foldable wing to pivot from its fully extended position to its retracted position when the aircraft encounters severe loads as may arise when the aircraft performs a dive maneuver by means of the actuator assembly being calibrated to supply insufficient torque to counter moments of a predetermined magnitude, acting on the winglets, from pivoting each winglet from its fully extended position to its retracted position.

7. An improved aircraft including at least one wing, comprising:

a foldable winglet positioned adjacent each wing;

a separate hinge assembly joining each wing to a respective one of the foldable winglets, allowing the respective winglet to pivot relative to the wing between a retracted position wherein the winglet extends substantially perpendicularly to an inboard portion of the wing and a fully extended position forming an outboard end of the wing that lies in a same plane as the wing; and an actuator assembly attached to each foldable winglet for generating sufficient torque to rotate each winglet from its retracted position to its fully extended position when the airplane is in cruise operation, wherein the actuator assembly is calibrated to allow loads on the wing of a predetermined magnitude to overcome the torque supplied by the actuator assembly and thereby allow the winglets to be rotated from their fully extended positions to their retracted positions.

8. An improved aircraft according to claim 7, wherein each separate hinge assembly extends substantially parallel to a longitudinal axis of the aircraft.

9. An improved aircraft according to claim 7, wherein the actuator assembly is manually energized to rotate each of the winglets from its retracted position to its fully extended position.

10. An improved aircraft according to claim 7, wherein the actuator assembly is energized by a sensor that senses when the aircraft is at or nearly at cruise condition.

11. An improved aircraft according to claim 7, wherein the actuator assembly comprises a separate actuator attached to a respective one of the winglets.

* * * * *